Nov. 3, 1964  J. F. STEBER  3,155,131
DECORING MACHINE
Filed Dec. 8, 1961  6 Sheets-Sheet 1
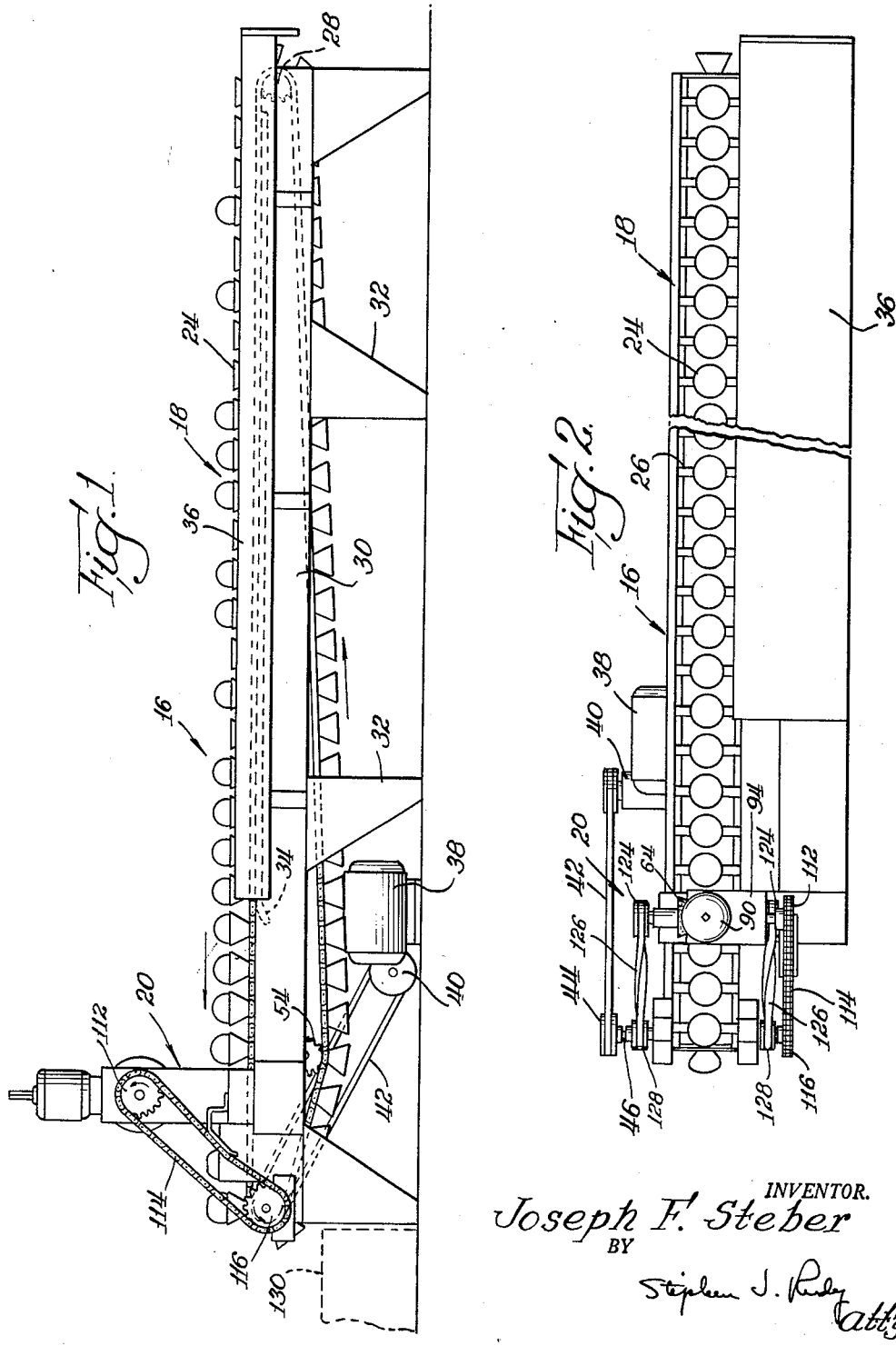
INVENTOR.
Joseph F. Steber
BY
Stephen J. Rudey
attys.

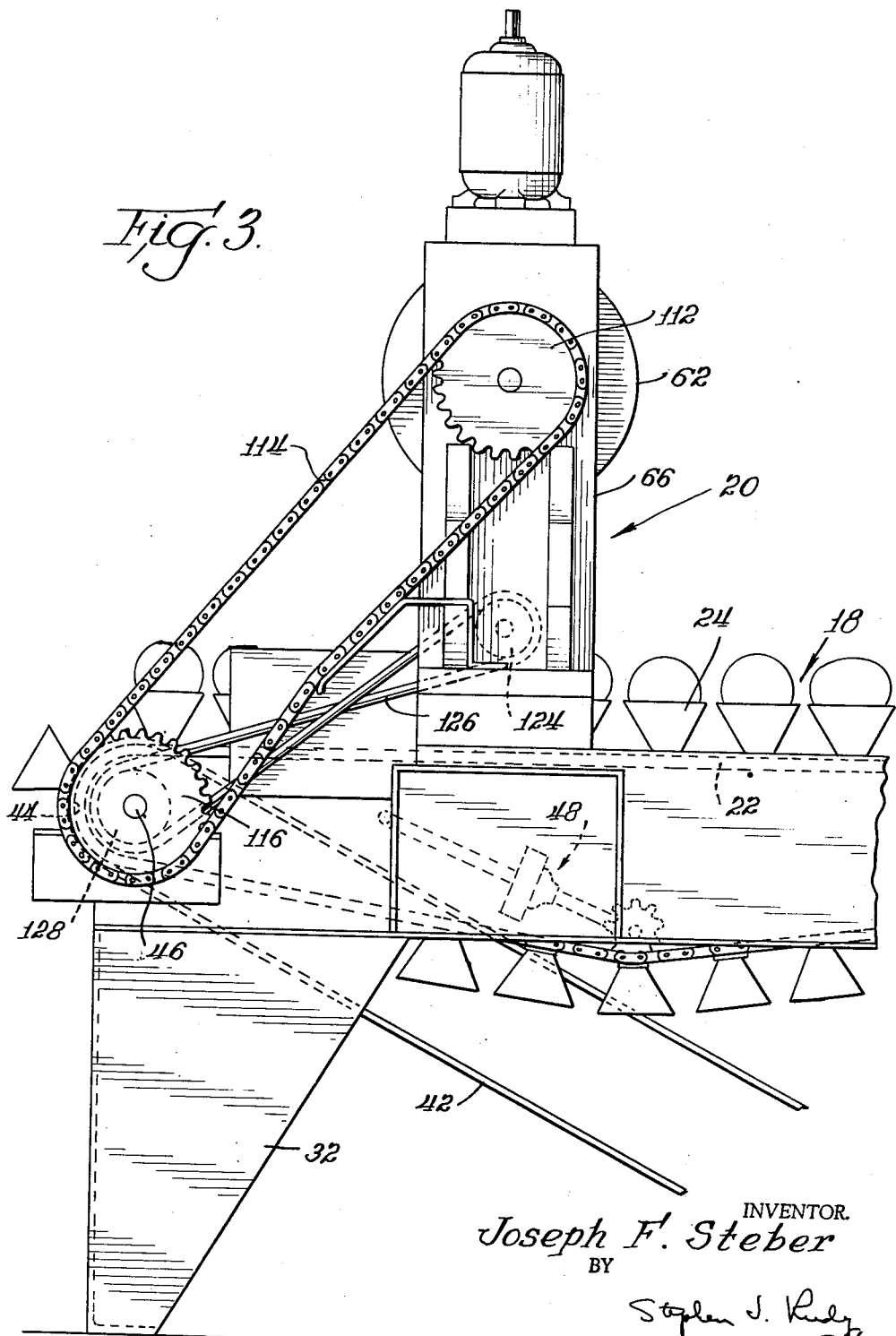

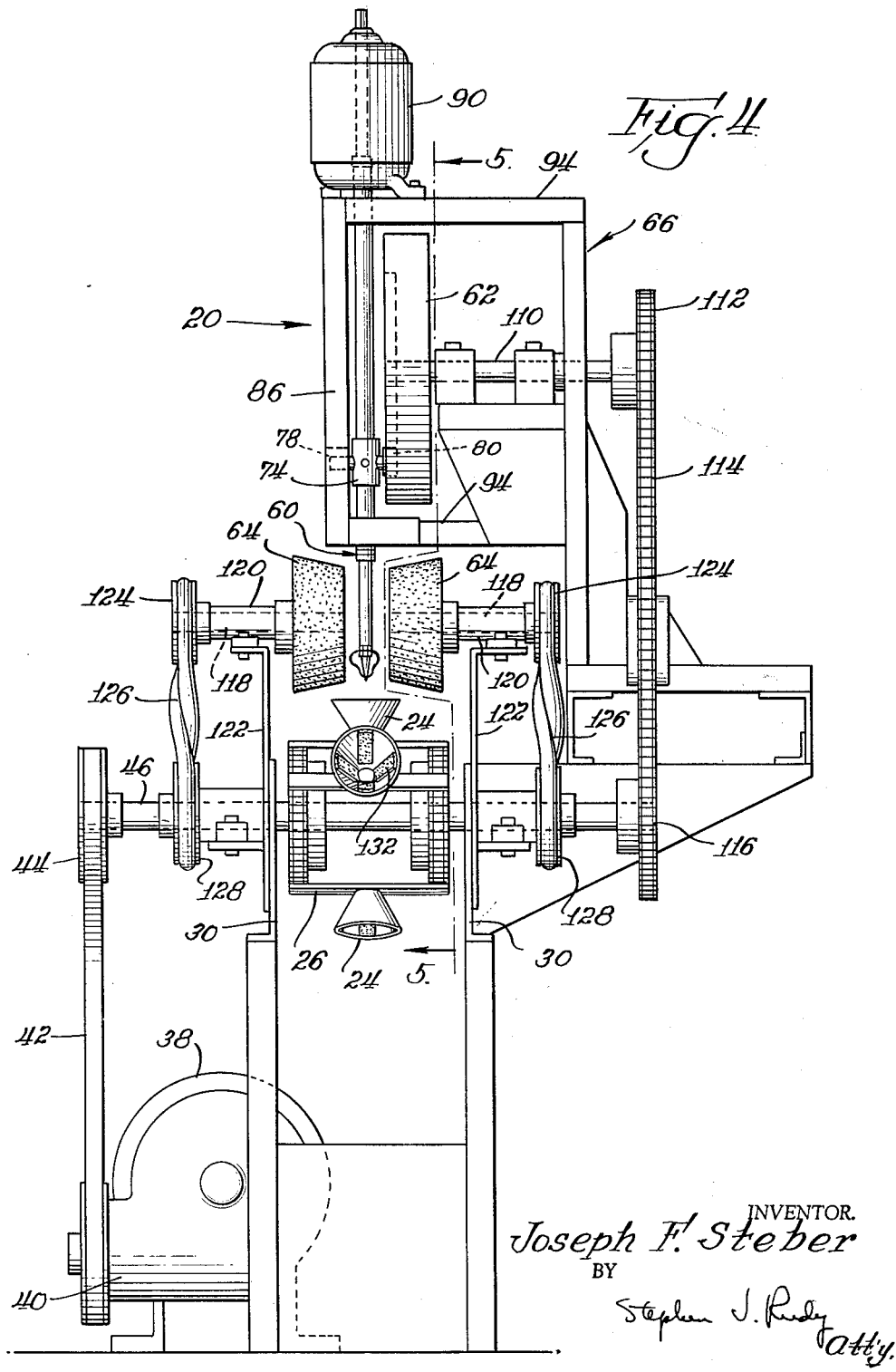

Nov. 3, 1964

J. F. STEBER 3,155,131

DECORING MACHINE

Filed Dec. 8, 1961

INVENTOR.
Joseph F. Steber
BY
Stephen J. Rudy
att'y

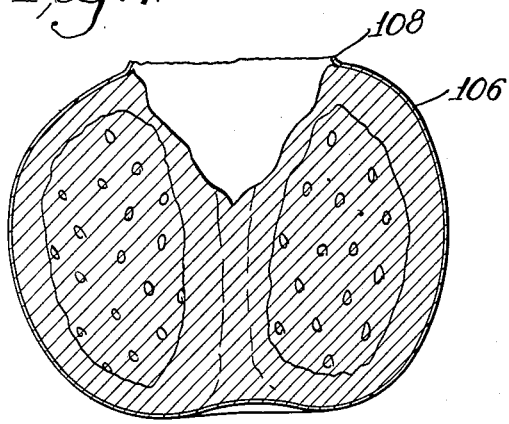
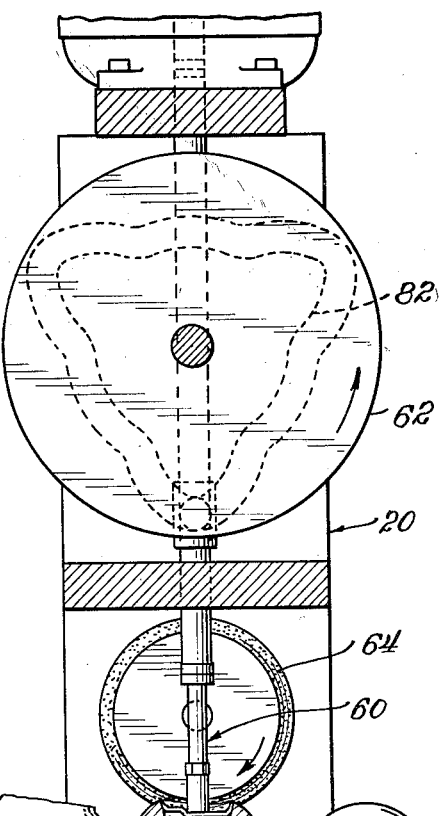
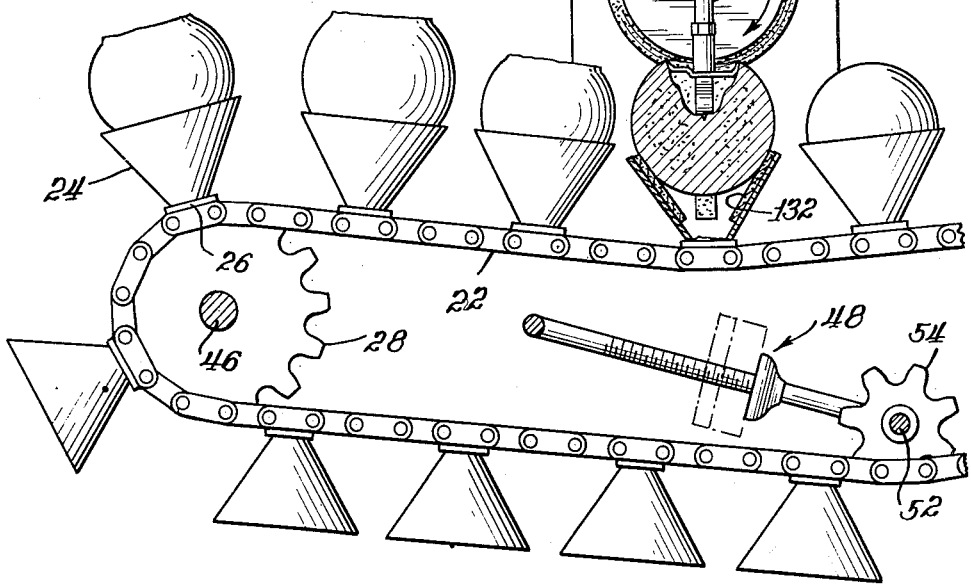

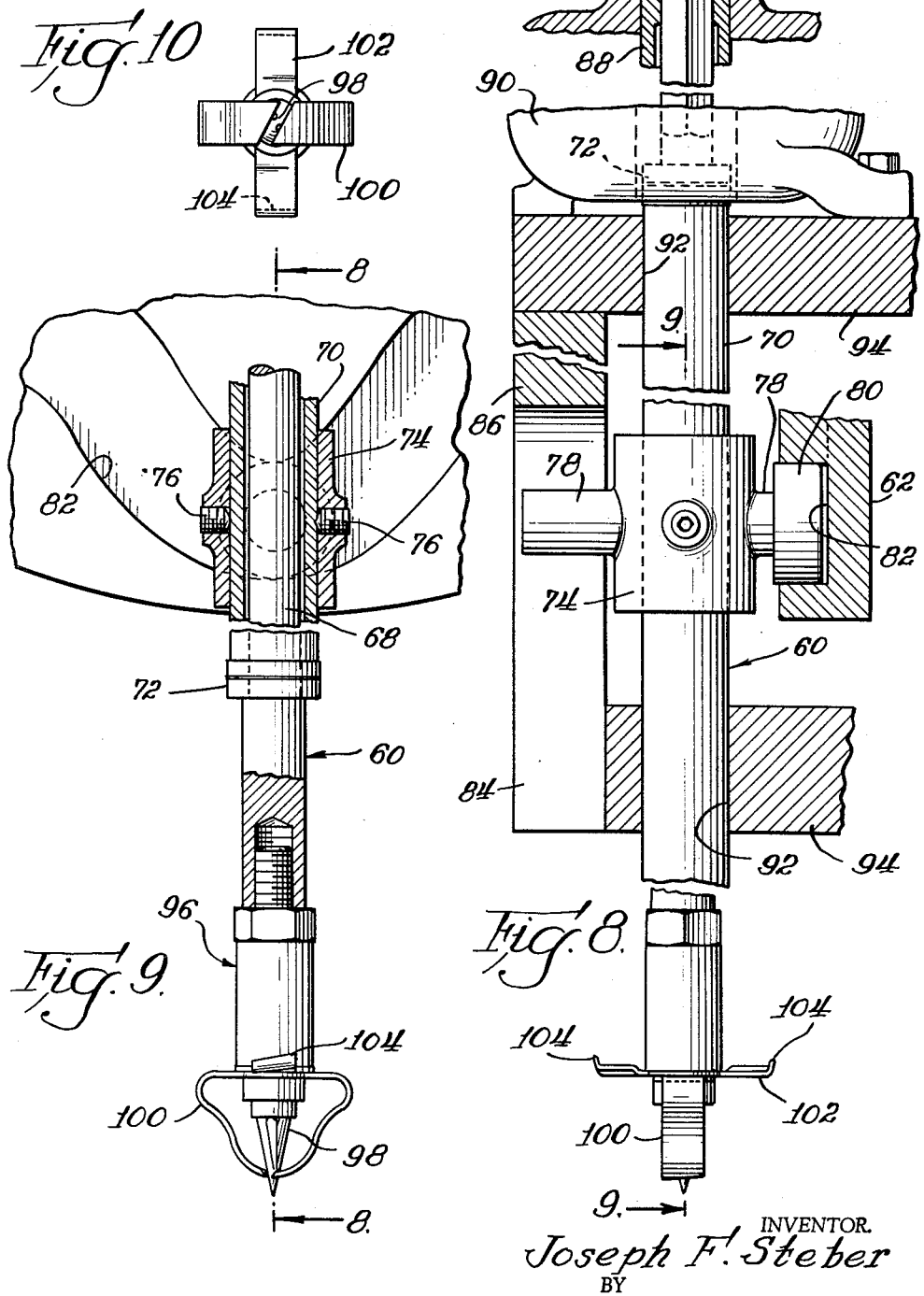

3,155,131
DECORING MACHINE
Joseph F. Steber, Green Bay, Wis., assignor to Green Bay Foundry and Machine Works, Green Bay, Wis.
Filed Dec. 8, 1961, Ser. No. 157,892
12 Claims. (Cl. 146—52)

This invention relates to an improvement in fruit and vegetable processing apparatus and more particularly to a decoring machine.

In processing certain fruits and vegetables, it is found necessary or desirable to remove the stem portion. This is especially important in processing tomatoes for canning, wherein the skins are to be removed in skinning apparatus, of the type disclosed in the patent to R. H. Winters, No. 2,429,785. If the stem portion is not removed before skinning, it will be found that the skin of the tomato cannot be satisfactorily removed in such type skinning apparatus.

The apparatus of the present invention not only provides rapid and satisfactory decoring operations on various types of fruits and vegetables, but will automatically handle vegetables of varying size. Accordingly, the apparatus of the present invention may be used, for example, to run an entire tomato crop, wherein the tomatoes will generally vary greatly in size, without the need for making additional adjustments on the apparatus after initial adjustment thereof. Furthermore, the apparatus of the invention will not bruise or injure the produce being handled, regardless of variation in size thereof.

The main object of this invention is to provide a decoring apparatus which will render rapid and satisfactory decoring operations on various types of fruits and vegetables.

A more specific object is to provide a decoring apparatus which will automatically operate to remove a predetermined stem portion from vegetable or fruit, regardless of variations in size thereof.

Another object of the invention is to provide a decoring apparatus which will not bruise or injure the produce being handled, regardless of variation in size thereof.

These and further objects and features of the invention will become more apparent from the following description and accompanying drawings wherein:

FIG. 1 is an elevation view of a machine embodying the principles of the invention;

FIG. 2 is a broken plan view of the machine of FIG. 1;

FIG. 3 is an enlarged view of an end portion of the machine of FIG. 1;

FIG. 4 is an end view of the portion shown in FIG. 3;

FIG. 6 is the same but showing the position of certain elements of the machine during a decoring operation;

FIG. 7 is a section view of a tomato after decoring by the machine of the invention;

FIG. 8 is a partial section view showing, in greater detail, a rotary decoring element used in the machine of FIG. 1;

FIG. 9 is a view generally as seen along line 9—9 in FIG. 8; and

FIG. 10 is a bottom end view of the decoring element of FIG. 8.

Figure 5:
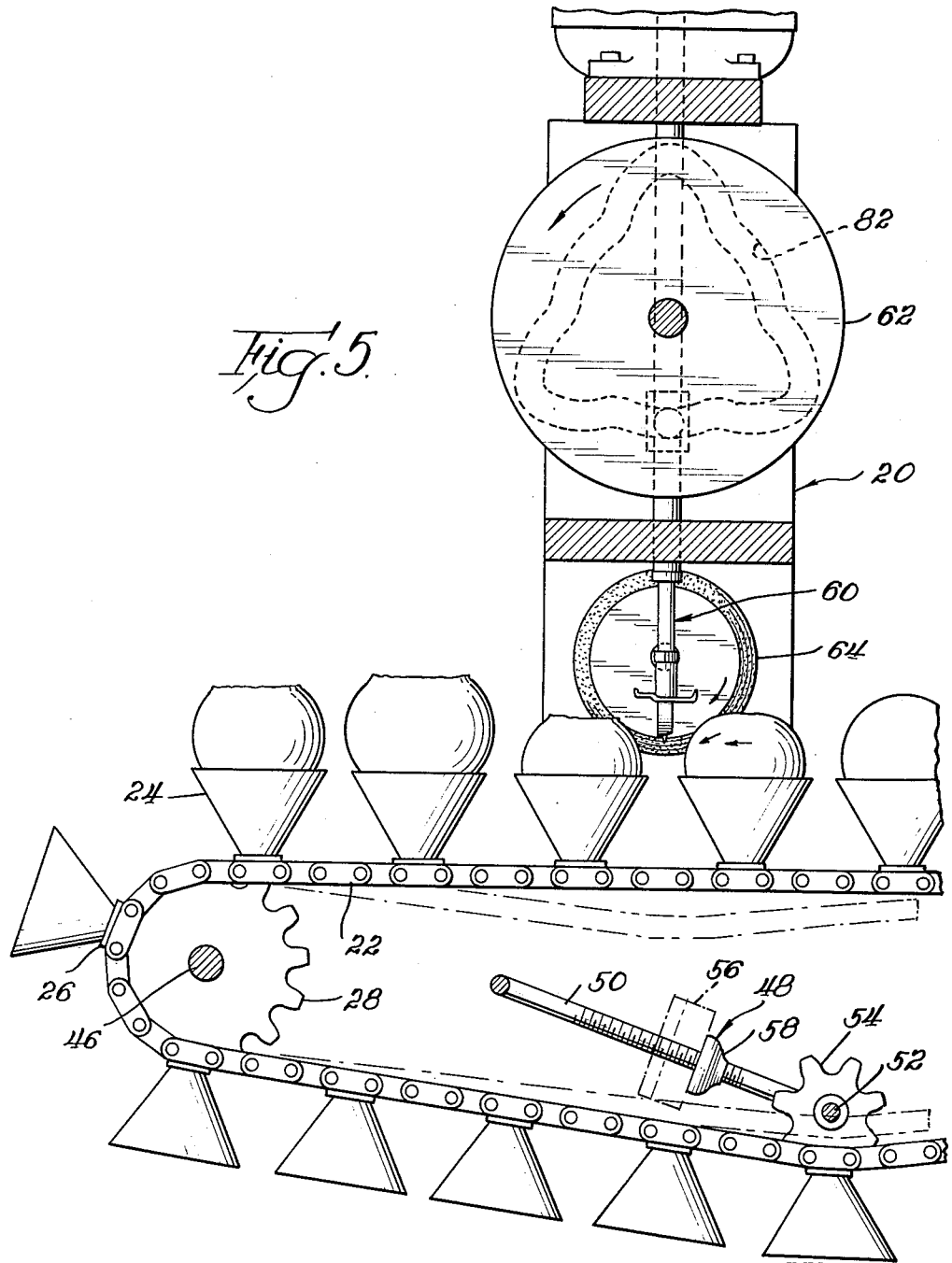
FIG. 5 is a view generally as seen along line 5—5 in FIG. 4, slightly enlarged.

Referring now to the drawings, numeral 16 identifies a decoring machine illustrative of an embodiment of the invention, which generally includes a conveyor assemblage 18, and a decoring mechanism 20. The conveyor assemblage 18 includes a plurality of link members forming an endless belt 22 adapted for supporting a plurality of cups, or cone-like elements 24 in linear uniformly spaced relation. The cups 24 are each affixed to a cross-bar 26 the ends of which are secured to the belt 22. A pair of sprocket wheels 28 are arranged at each extremity of the belt 22 for the horizontal support thereof. The conveyor assemblage 18 is mounted in frame members including parallel arranged side plates 30, which are supported by leg means 32, said frame members being adapted for the rotary support of the sprocket wheels 28. As best seen in FIG. 1, a plate 34 is positioned beneath a major portion of the upper flight of the belt 22, to prevent sagging of the belt in the supported portion. A shelf 36 is arranged on the side of the plate 34, which shelf may serve as a work table for operators loading the conveyor belt.

A power drive means, including a motor 38 and a speed reducer 40, is adapted to operate the belt 22 so that the upper flight thereof will move to the left, as seen in FIG. 1. Toward this end, a drive belt 42 drivingly connects the speed reducer 40 with a pulley, or sheave 44 arranged on the end of the shaft 46 on which the sprocket wheels 28, at one of the conveyor, are mounted.

From the foregoing, it will be seen that the conveyor belt 22 is arranged so that the upper flight is flexible in the region of the decoring mechanism 20. In other words, such flexibility allows said portion of the upper flight to be forced downward a predetermined amount, which is an important feature of the arrangement, as will later become more apparent. The flexibility of the belt 22 may be adjusted by a weighted arm assemblage 48, which as best seen in FIG. 3, comprises a rod 50, one end of which is pivotally mounted to the frame members 30, the other end being affixed to a cross-shaft 52, the ends of which rotatably support a pair of sprocket wheels 54 which engage the belt 22. A weight 56 is slidingly supported upon the rod 50, the axial position of the weight 56 being adjustably maintained by a collar 58 threadably affixed to the rod 50. By positioning the weight closer to the cross-shaft 52, more pressure is exerted upon the belt 22, thus increasing the tension in the belt, and reducing the flexibility thereof. Movement of the weight away from the cross-shaft 52, lessens the pressure on the belt, and reduces belt tension, thus increasing the flexibility thereof. It will be noted, that a given amount of belt tension is induced by the unsupported weight of the lower flight of the belt. The weighted arm assemblage 48 functions primarily as a belt flexibility control means.

As best seen in FIGS. 3 to 5, the decoring mechanism 20 basically comprises a rotatable coring blade, or knife assemblage 60; a cam means 62 adapted to provide reciprocal movement to the coring knife 60, and a pair of produce positioning rollers 64. A frame means 66 is adapted for the support of the coring blade assemblage 60, as well as the cam means 62.

Coring blade assemblage 60, the details of which are best seen in FIGS. 8 to 10, includes an inner, or drive shaft 68, a sleeve 70 which is affixed to the drive shaft by thrust bearing means 72 located at each end of the sleeve, and a collar 74 secured to the sleeve 70 by set screw means 76; the thrust bearings 72 provide unrestricted rotation of the drive shaft 68 within the sleeve 70, and at the same time, transmit reciprocal movement of the sleeve to the drive shaft, in a manner as is well known to those skilled in the art. The collar 74 is provided with a pair of diametrically arranged pins 78, one of which supports a roller bearing 80 positioned in a cam groove 82 formed in a side surface of the cam means 62, while the other pin is arranged to project into a vertically arranged guide slot 84 formed in a plate 86 comprising a part of the frame means 66. The upper end of the drive shaft is of non-circular cross-section and is arranged for driving engagement with a hollow shaft 88 of a motor 90, said engagement permitting reciprocal movement of the end of the drive shaft 68 within the motor shaft 88. The sleeve 70 is slidably arranged in axially disposed holes 92 provided in plates 94 forming part of the frame means 66, whereby the sleeve is guided for reciprocal motion along a vertical axis.

Removably affixed to the lower end of the drive shaft 68 is a decoring head assembly 96 which includes an auger-like pointed tip 98, a blade element 100 formed to provide symmetrically curved wings which terminate in spaced relation to the end region of the tip 98, and a horizontally disposed blade 102 which is arranged at the upper end of the blade element 100 and at a right angle thereto, and which has upturned ends 104. The configuration of the decoring head assembly 96, especially the shape of the blade element 100, may be varied to suit the particular type of produce to be decored; the decoring head assembly 96 illustrated, is especially well suited for decoring tomatoes. A sample of the operation performed by the decoring head assembly 96 described, is shown in the tomato 106, as seen in FIG. 7. It will be noted that the ends 104 of the blade 102, cut the skin of the tomato to provide an upturned lip 108 about the edge of the crater formed by the head assembly 96. It has been found that such a lip, aids in subsequent skinning operations.

The cam means 62 is supported upon one end of a shaft 110, the other end of the shaft having a sprocket wheel 112, engaged by a drive chain 114 which is mounted upon a sprocket wheel 116 secured to the end of the shaft 46. In such manner, the rotary motion of the cam means 62 is synchronized with movement of the conveyor belt 22. The cam groove 82, which is a closed continuous path, has three lobes spaced 120° apart, whereby the blade assemblage 60 will complete three reciprocal cycles for every 360° rotation of the cam means 62. The cam operating cycle is such as to make maximum downward movement of the decoring head assembly 96 coincide with the arrival of a cup-like element 24 directly beneath the head assembly (FIG. 6) and to make maximum upward movement of the decoring head assembly coincide with arrival of lateral midpoint between said cup-like elements (FIG. 5). Thus, for every single revolution of the cam means 62, three tomatoes, or produce being operated upon, will be decored.

The positioning rollers 64, which preferably may be made of a non-skid material (when moist) such as laminated fibre board, etc., each have an inwardly directed tapered periphery, as best seen in FIG. 4. Each roller 64 is mounted upon one end of a shaft 118 supported in a journal 120 affixed to a plate 122 attached to a side plate 30. The other end of each shaft has a sheave 124 mounted thereupon, for receipt of a drive belt 126, which is arranged for driving engagement upon a sheave 128 secured to the shaft 46. Each drive belt 126, is crossed (FIG. 3) so that rotation of each roller 64 is opposite to rotation of the shaft 46.

The purpose of the positioning rollers 64, is to position each tomato, or other fruit or vegetable being processed, so that the decoring head blades will remove an equal amount of stem portion from each tomato regardless of tomato size. In effect, the positioning rollers 64 force the tomato, and supporting cup 24, downwardly an amount proportional to the size of the tomato, i.e., a large tomato, and supporting cup will be moved downwardly a greater amount than a small tomato and its supporting cup. The flexibility of the upper flight of the conveyor belt 22, in the region of the decoring mechanisms 20, as previously described, allows for such downward movement of any given cup 24. The size and proportions of a given decoring head assembly 96, are made to most effectively remove the stem portions as normally encountered in the produce being run, that illustrated in FIGS. 8 to 10 (full size), being found satisfactory for decoring tomatoes. It will be noted that the peripheral movement of the positioning rollers, at lower extremity, is in the same direction as movement of the conveyor belt 22. Thus, the produce is less inclined to be rotated within the holding cups upon engagement by the positioning rollers. The flexibility of the conveyor belt 22, in the region of the decoring mechanism 20, is regulated by the arm assemblage 48, so that the pressure of the rollers 64 upon the produce will not be excessive. In the absence of such adjustment feature, certain types of produce, such as very ripe tomatoes, could be damaged.

Operation of the decoring machine 16 above described is believed to be obvious. Briefly, one or more operators, position the produce being run, one to each cup 24, taking care to see that the stem is upright and substantially coincident with a vertical axis of the cup. After the produce is decored, it will fall from the cups into a receptacle 130 at the end of the machine, as the belt passes over the sprocket wheels 28. If desired, a plurality of strips 132 of non-skid material (similar to the material of the positioning rollers 64), may be affixed within each cup 24, to prevent slipping of the produce within the cups when engaged by the positioning rollers 64. Obviously, the length of the conveyor belt 22, or the number of cups 24, is not critical, and may be varied to best suit the work load contemplated.

It will be seen that the decoring machine 16 will satisfy all of the objectives set forth hereinbefore and will be found to be a substantial improvement over such machines of the prior art.

The foregoing description has been given in detail without thought of limitation since the inventive principles involved are capable of assuming other forms without departing from the spirit of the invention or the scope of the following claims.

What is claimed is:

1. Decoring apparatus comprising in combination a continuously operated conveyor means including an endless belt which is flexible for vertical movement, and a decoring mechanism, said conveyor means being adapted to move decorable food items to the decoring mechanism in sequential order, said decoring mechanism having a reciprocable rotary coring knife assemblage, and a pair of positioning rollers straddling said knife assemblage adapted to engage a decorable item as it moves beneath the knife assemblage to flex the belt vertically as required to maintain the upper surface of each food item in the same horizontal plane.

2. Decoring apparatus comprising in combination a continuously operated endless conveyor belt having a plurality of decorable food item holding cups mounted thereon, said belt being flexible for vertical movement, a decoring mechanism positioned near one end of the belt, said decoring mechanism having a vertically reciprocable rotary coring knife assemblage, and a pair of positioning rollers in spaced relation which rollers are positioned so as to straddle said knife assemblage and adapted to engage the upper surface of a food item as it is moved into vertical alignment with the knife assemblage, and to move the food item and its holding cup downwardly so that the upper surface of the food item is in a given horizontal plane relative to the coring knife assemblage.

3. Decoring apparatus comprising in combination a continuously operated endless horizontally arranged conveyor belt having a plurality of decorable food item holding cups mounted thereon, said belt being flexible for vertical movement, a drive means for said belt, a decoring mechanism positioned near one end of the belt, said decoring mechanism having a vertically reciprocable rotary coring knife assemblage, and a pair of rollers in spaced relation and positioned so as to straddle said knife assemblage, said rollers being mounted on shafts in axial alignment, the rotary speed of said rollers being synchronized with the speed of the belt, said rollers being adapted to engage the upper surface of a food item as it is moved into vertical alignment with the knife assemblage and to move the food item and its holding cup downwardly so that the upper surface of the food item is in a given horizontal plane relative to the lower end of the coring knife assemblage.

4. Decoring apparatus comprising in combination a continuously operated endless horizontally arranged flexible conveyor belt having a plurality of decorable food item holding cups mounted thereon, a drive means for said belt, a decoring mechanism positioned near one end of the belt, said decoring mechanism having a vertically reciprocable rotary coring knife assemblage, and a pair of rollers in spaced relation and positioned so as to straddle said knife assemblage, said rollers each being mounted on the end of a shaft which shafts are in axial alignment, means to connect the roller shafts with said drive means whereby the rotary speed of the rollers is in synchronism with said belt, said rollers being adapted to engage the upper surface of a food item as it is moved into vertical alignment with the knife assemblage and to move the food item and its holding cup downwardly so that the upper surface of the food item is in a given horizontal plane relative to the lower end of the coring knife assemblage.

5. Decoring apparatus according to claim 4, wherein means are provided for regulating the tension of said conveyor belt whereby the vertical flexible movement of the belt may be controlled.

6. Decoring apparatus according to claim 4, wherein said decoring mechanism includes a cam means adapted to cause reciprocal movement of said coring knife assemblage.

7. Decoring apparatus according to claim 6, wherein said cam means includes an endless cam groove adapted for receipt of means connected to said coring knife assemblage.

8. Decoring apparatus according to claim 7, wherein means are provided for driving said cam means in synchronism with the operation of said continuously operated conveyor belt.

9. Decoring apparatus according to claim 8, wherein a motor means is arranged to provide rotary movement to said coring knife assemblage.

10. A rotary coring knife assemblage for use in decoring apparatus comprising, a pointed tip, a first blade element formed to provide symmetrically curved wings which terminate in spaced relation to the end region of the tip, and a second blade element which is generally flat and is arranged normal to the plane of the first blade element at the base thereof.

11. A rotary coring knife assemblage according to claim 10, wherein the second blade element has upturned ends.

12. Decoring apparatus according to claim 4, wherein said holding cups are positioned in a single line.

References Cited in the file of this patent
UNITED STATES PATENTS

| | | |
|---|---|---|
| 1,448,532 | Harding | Mar. 13, 1923 |
| 1,923,712 | Deitz | Aug. 22, 1933 |
| 2,036,779 | Sharpe | Apr. 7, 1936 |
| 2,054,409 | Clarke | Sept. 15, 1936 |
| 2,155,730 | Miller | Apr. 25, 1939 |
| 2,173,336 | Lamere et al. | Sept. 19, 1939 |
| 2,252,951 | Urschel et al. | Aug. 19, 1941 |